United States Patent [19]

Charlson et al.

[11] Patent Number: 5,211,429
[45] Date of Patent: May 18, 1993

[54] POLYETHYLENE PIPE JUNCTION DEVICE

[76] Inventors: Norman E. Charlson; Gregory D. Charlson, both of 1020 50th Ave. NE., Minneapolis, Minn. 55421; Giancarlo Dallai, Via Roma 63, Reggiolo R.E. 42046, Italy

[21] Appl. No.: 756,558

[22] Filed: Sep. 9, 1991

[51] Int. Cl.⁵ ............................................. F16L 33/00
[52] U.S. Cl. ..................................... 285/238; 285/259
[58] Field of Search ............... 285/238, 256, 259, 249, 285/255

[56] References Cited

U.S. PATENT DOCUMENTS

| | | | |
|---|---|---|---|
| 2,787,480 | 4/1957 | Staller | 285/238 |
| 2,967,067 | 1/1961 | Singer | 285/238 |
| 3,453,006 | 7/1969 | Levake . | |
| 3,817,561 | 6/1974 | Kay | 285/238 X |
| 3,817,562 | 6/1974 | Cook et al. | 285/238 |
| 4,220,359 | 9/1980 | Evenson et al. | 285/259 X |
| 4,275,122 | 6/1981 | Fisher . | |
| 4,597,594 | 7/1986 | Kacalieff et al. . | |
| 4,635,972 | 1/1987 | Lyall . | |

FOREIGN PATENT DOCUMENTS

| | | | |
|---|---|---|---|
| 275657 | 7/1966 | Australia | 285/238 |
| 705031 | 3/1965 | Canada | 285/238 |
| 338880 | 10/1989 | European Pat. Off. | 285/238 |
| 429332 | 7/1967 | Switzerland | 285/238 |

OTHER PUBLICATIONS

Four page document entitled "Competition", pp. 10-13, (Exhibit A).
Portions of a catalog labelled "Raccordi Sferici DAL-LAI Catalogo E listino prezzi", 4 pages including cover page, table of contents, p. 12, and back cover. Published in Italy in 1986 (Exhibit B). Drawing labelled Attachment 1 which shows various features of a coupling.

Primary Examiner—Dave W. Arola
Attorney, Agent, or Firm—Merchant, Gould, Smith, Edell, Welter & Schmidt

[57] ABSTRACT

A pipe junction device is disclosed for mounting on an exterior surface of a resilient pipe, such as polyethylene pipe. The pipe junction device includes a generally cylindrical sleeve member having an inner surface including at least one barb, preferably two, projecting inwardly and extending circumferentially around the inner surface. The inner diameter of the sleeve at the barbs is less than a diameter of the exterior surface of said pipe in the uncompressed state. The sleeve slidably receives the pipe wherein the resilient properties of the pipe expand the exterior surface of the pipe in the regions adjacent the region at the barbs to define diameters greater than the diameter of the pipe at the region at the barbs to restrict sliding movement of the sleeve member with respect to the pipe to securely mounting the sleeve to the pipe. An intermediate trough surface portion is disposed between two barbs having multiple levels.

13 Claims, 2 Drawing Sheets

POLYETHYLENE PIPE JUNCTION DEVICE

FIELD OF THE INVENTION

The present invention relates generally to pipe connectors, or pipe junction devices, for use in connecting one pipe to another pipe or for connecting a pipe to a device such as a valve or a pump. The present invention relates particularly to pipe junction devices for use in connection with polyethylene pipe.

BACKGROUND OF THE INVENTION

Various devices have been used in the past to connect pipes to other structures such as to another pipe or to a pump or valve. With respect to connecting pipes to other structures in general, some devices are known which slidably receive the pipe in a first direction and once the pipe is positioned on the device, the device resists removal of the pipe from the device. Devices referred to generally as external spigots include one or more projections on an outer surface which engage an inner surface of the pipe. An internal or inner spigot device includes one or more projections which face radially inwardly and engage the outer surface of the pipe.

A related device known for connecting pipes to other structures including pipes is a device referred to as a compression fitting. The compression fitting typically includes an outer sleeve member with structure for engaging the outer surface of the pipe. In other words, an inner spigot member is first provided. A separate inner member is then placed within the pipe. The inner member is then expanded to an enlarged position to compress or squeeze the pipe between the inner member and the outer sleeve member. Alternatively, the fitting may include a rigid inner member and a contractible outer member which is contracted to compress or squeeze the pipe onto the inner member. An example of this is a rubber hose clamp.

A known method for joining pipes made from compatible plastics is to melt or fuse the ends of two adjacent lengths of pipe together to join the pipes.

The above-noted pipe junction devices and methods are useable with a variety of different types of pipes. Often the physical properties and characteristics of the pipe impose limitations on using the various pipe junction devices and methods of joining pipe. Pipes made from polyethylene plastic are one type of pipe where problems are encountered because of the properties of the pipe when conventional pipe junction devices and methods are employed. For example, the polyethylene pipe is fairly rigid and is difficult to compress between two members. It will generally only weld to compatible plastics. Other limitations and problems stem from the difficulty in which the devices and methods may be employed. For example, generally the pipes are joined to other pipes or other structures in the field away from the factory during assembly or repair of the pipe system.

Polyethylene pipes are fairly well known in the art and have proven useful in a variety of applications for handling water and other liquids, possibly mixed with solids. Polyethylene pipes are also useful for handling air and other gases. Polyethylene pipes are useful for irrigation, mining, dredging, dewatering, and other uses where gases and liquids, and possibly solids, are transported. Pipes made from polyethylene are useful because they have many desirable properties including being sufficiently rigid and yet flexible and lightweight. Polyethylene pipe is abrasion and corrosion resistant both with respect to the liquids and gases transported through the pipe and with respect to the environment which is exposed to the exterior of the pipe.

While polyethylene pipe has characteristics that make it an excellent choice for piping in many different applications, one continuing problem has been the difficulty in connecting the pipe to another pipe or to structures such as pumps or valves. One known method of connecting two lengths of polyethylene pipe together includes heat fusing or butt fusing the pipes together. Typically, this requires a special machine designed to heat the ends of the pipe and compress them together to form the weld. Quality control and the reliability of the welds when improperly fused may be a problem.

Other known techniques for attaching two lengths of polyethylene pipe together include using internal spigot type structures which are secured around the exterior of the pipes and compress the pipes radially inwardly to maintain the pipes in place with respect to the junction device. For example, a metal sleeve-type device has been employed wherein the sleeve fits over the outside end of the pipe and then is rolled down to mount the sleeve to the pipe. Further structure, such as a plurality of spikes, may be added that penetrate from the sleeve into the pipe to further assist in holding the sleeve on the end of the pipe. These may not provide leak proof joints, are prone to coming loose over time due to the properties of the pipe, and are difficult to install in the field. This type of coupling is comparable to the stub end which requires heat fusing in the field. Another example is structure which comprises at least two separate members which are bolted or otherwise attached around the exterior of the pipe. This too is prone to coming loose over time or may freeze or rust in the attached state.

Other devices for connecting two lengths of polyethylene pipe together include devices which fit inside the end of each pipe and are then provided with a clamp to clamp the pipe to the inner device. These compression-type fittings are prone to failure and are cumbersome to install. Alternatively, a flange joint may be used where one end of the pipe is made to include a special outwardly extending flange attachable to another pipe or other structure having a mating flange.

The known methods of connecting polyethylene pipe to another pipe or to other structure have been plagued by various common problems. One common problem is the reliability of the joint. Another common problem has been that the connecting structure is cumbersome to position and difficult to install in the field. There exists a need for a pipe junction device which permits easy and reliable structure for connecting pipes, such as polyethylene pipes, to another pipe or to other structures.

SUMMARY OF THE INVENTION

The present invention relates to a pipe junction device for mounting on an exterior surface of a resilient pipe. The pipe junction device includes a generally cylindrical sleeve member with an opening and an inner surface extending from the opening and including at least one barb, preferably two, projecting inwardly and extending circumferentially around the inner surface. The inner surface extends from a first end of the sleeve member toward a second end. The barbs provide the sleeve member with an inner diameter less than an inner diameter of the sleeve member adjacent the barbs. The inner diameter of the sleeve at the barbs is less than a diameter of the exterior surface of the pipe in the uncompressed state. Each barb preferably comprises at least a first inclined surface and a second surface generally transverse or perpendicular to a longitudinal axis of the sleeve. These surfaces of each barb intersect at a barb tip.

The sleeve slidably receives the pipe wherein the resilient properties of the pipe expand the exterior surface of the pipe in the regions adjacent the region at the barbs to define diameters greater than the diameter of the pipe at the region at the barbs to restrict sliding movement of the sleeve member with respect to the pipe to securely mount the sleeve to the pipe. In the preferred embodiment, the pipe is comprised of polyethylene.

In the preferred embodiment, an intermediate trough surface portion is disposed between two barbs having multiple levels and surfaces. The multiple levels of the trough surface portion comprise a first surface portion adjacent the first barb and a second surface portion adjacent the second barb, with the first surface portion having a greater inner diameter than the second surface portion. Preferably, a second intermediate trough surface portion having multiple levels and similar structure is disposed between the second barb and the second end. The multiple level structure provides greater barb depth at the transverse surface of each barb without decreasing the minimum inner diameter at the barb tips.

In the preferred embodiment, an angled entry portion is provided on the sleeve member to cooperate with a bevelled edge on the pipe to facilitate initial insertion of the pipe into the sleeve member. Preferably, the sleeve member also includes a stop to limit the amount of pipe travel into the sleeve member.

These and other features which characterize the invention are pointed out with particularity annexed hereto, and forming a part hereof. However, for a better understanding of the invention, its advantages and objects obtained by its use, reference should be added to the drawings which form a further part hereof and to the accompanying descriptive matter in which there is illustrated and described a preferred embodiment of the invention.

BRIEF DESCRIPTION OF THE FIGURES

In the drawings in which like reference numerals indicate corresponding parts throughout the several views.

DETAILED DESCRIPTION OF THE INVENTION

Figure 1:
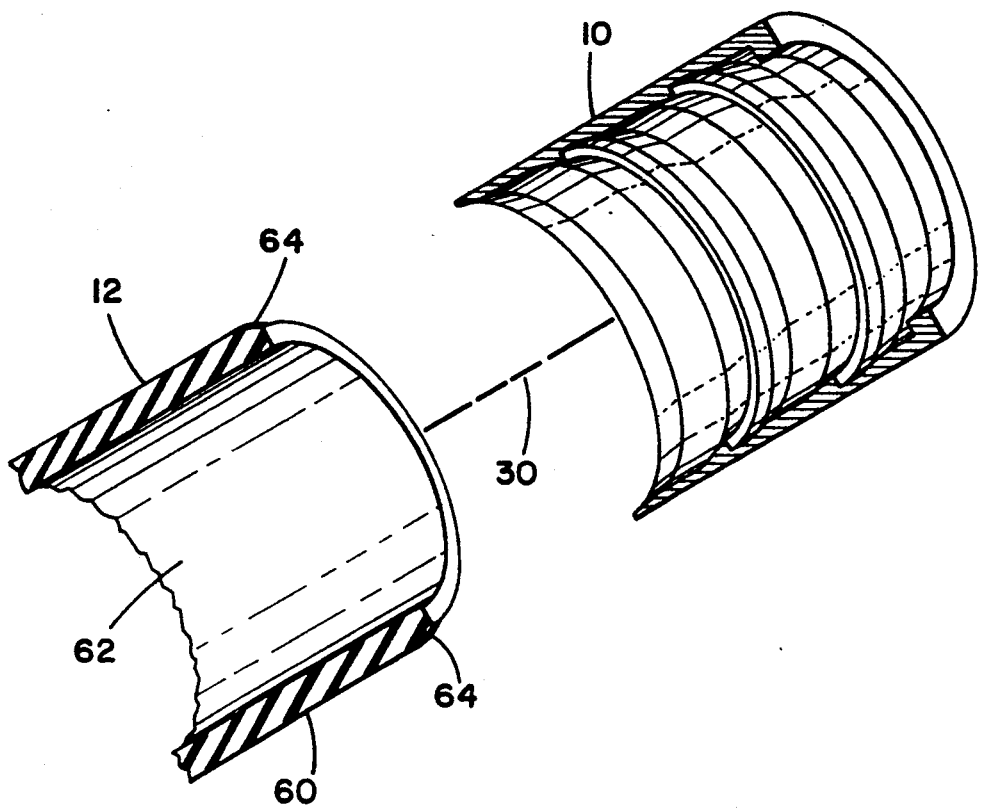
FIG. 1 is a cross-sectional perspective view of a preferred embodiment of a sleeve member according to the principles of the present invention slideably mountable to a pipe in the direction of the longitudinal axis.
Figure 2:
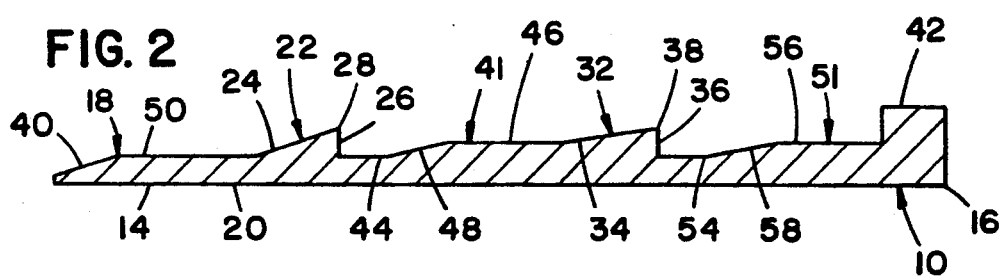
FIG. 2 is an enlarged cross-sectional profile of the sleeve member shown in FIG. 1.
Figure 3:
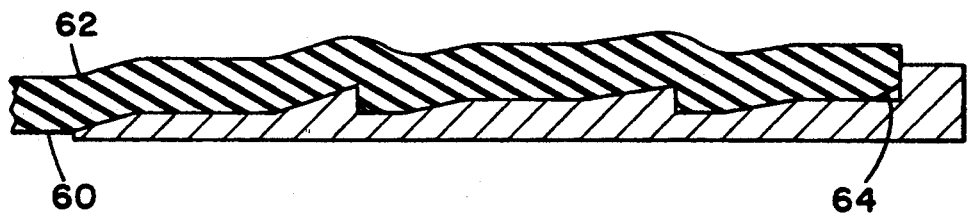
FIG. 3 is the cross-sectional profile of the sleeve member shown in FIG. 2 with the pipe operatively positioned sleeve member.

Referring now to the drawings, there is shown in FIGS. 1-3 an embodiment of a pipe connector, or pipe junction device 10. The pipe junction device 10 has a sleeve-like cylindrical shape. Hereinafter, device 10 will be referred to as sleeve 10. An inner surface 18 of sleeve 10 includes projections which are engageable with pipe 12. Sleeve 10 also includes an outer surface 20.

Pipe 12 includes the outer wall or outer surface 60 and an inner wall or inner surface 62 defining an inner passage. Materials such as liquids and liquid/solid mixtures are transportable through the inner passage defined by the inner surface 62 of the pipe 12. Preferably, pipe 12 is made from polyethylene plastic. Polyethylenes are generally known as a group of polyolefin polymers derived from ethylene by polymerization by heat and pressure. Pipes made from polyethylene are commercially available through a variety of sources, including Polaris Pipe Co., 16340 Roscoe Blvd., Suite 210, Van Nuys, Calif. 91406.

Referring now to FIGS. 2 and 3, sleeve 10 is shown in greater detail. Inner surface 18 extends from a first end 14 toward a second end 16 of sleeve 10. Sleeve 10 also includes a longitudinal axis 30 (See FIG. 1). The inner surface 18 of sleeve 10 defines a profile having a plurality of functions during operation when the sleeve 10 is mounted on pipe 12. Inner surface 18 includes at least one barb 22 projecting radially inwardly. In the preferred embodiment, a second barb 32 is provided at a spaced-apart distance from first barb 22. Preferably, first barb 22 and second barb 32 extend completely around the inner surface 18 concentric with axis 30.

During operation, sleeve 10 is slidably mounted on pipe 12. Once sleeve 10 is operatively positioned on pipe 12, first barb 22 and second barb 32 act to restrict movement of the sleeve away from pipe 12. In particular, barbs 22,32 of sleeve 10 compress pipe 12 radially inwardly. Pipe 12 has resilient properties when compressed radially inwardly and is self-biased back toward its original uncompressed state. It is to be appreciated that pipe 12 will bias itself toward its uncompressed state as long as it is not exposed to temperatures exceeding those temperatures necessary to cause pipe 12 to lose its resilient properties. The resilient properties of pipe 12 expand pipe 12 outwardly such that the diameter of pipe 12 at points just past each barb 22,32 in a direction toward second end 16 are expanded to a diameter greater than the inner diameter of the sleeve 10 at each barb 22,32. The force necessary to blow off sleeve 10 from pipe 12 is greater than the forces applied to the pipe 12 and sleeve 10 by internal pressure during operation acting to separate the pipe 12 from the sleeve to 10 or cause the joint to fail. The sleeve 10 also resists being pulled off pipe 12 by external tensile and bending loads applied to the pipe and sleeve.

In the preferred embodiment, the barbs 22,32 extend circumferentially completely around the sleeve 10. These barbs function to also seal the interior of the sleeve from the exterior when the sleeve is connected to another pipe or other structure. When the pipe 12 is bent with respect to sleeve 10, sealing may still occur even though the axes of each are not concentric.

Each barb 22,32 comprises a plurality of surfaces. With respect to first barb 22, front inclined surface 24 and back surface 26 extend at least partially radially inwardly toward axis 30 and intersect at barb tip 28. Similarly, front inclined surface 34 and back surface 36 intersect at barb tip 38 to form second barb 32. Barb tips 28,38 of the preferred embodiment are relatively sharp structures. Front inclined surfaces 24,34 of first and second barbs 22,32 are angled surfaces which diverge toward axis 30 when moving in a direction from first end 14 toward second end 16. These surfaces assist in compressing the exterior surface 60 of pipe 12 past the minimum inner diameters defined by barb tips 28,38. Back surfaces 26,36 of each barb 22,32 are preferably at about 90 degrees to the longitudinal axis 30.

In the preferred embodiment, the space between first barb tip 28 and second barb tip 38 also includes a multilevel region, or intermediate trough surface portion 41, connecting the back surface 26 of first barb 22 to the front inclined surface 34 of second barb 32. The intermediate trough surface portion 41 includes a first trough surface 44, preferably parallel to the longitudinal axis 30, adjacent back surface 26 of first barb 22. The intermediate trough surface portion 41 further includes a second trough surface, or raised surface 46, which is adjacent front inclined surface 34 of second barb 32. Preferably, the raised surface 46 is parallel to the longitudinal axis. Between the first trough surface 44 and the raised surface 46 is an inclined transition surface 48. As shown in FIGS. 2 and 3, raised surface 46 provides sleeve 10 with a smaller inner diameter than trough surface 44.

In the preferred embodiment, second barb 32 can also be defined as comprising four different surfaces extending or protruding from the base region of the sleeve 10. A first surface corresponds with transition surface 48. A second surface corresponds with raised surface 46. A third surface corresponds with front inclined surface 34. A fourth surface corresponds with back surface 36.

In the preferred embodiment, a secondary trough surface portion 51 is provided immediately adjacent back surface 36 of second barb 32. Secondary trough surface portion 51 includes a trough surface 54. An inclined transition surface or ramp surface 58 connects trough surface 54 to a raised surface 56. Preferably, trough surface 54 and raised surface 56 are parallel to the longitudinal axis.

In the preferred embodiment, sleeve 10 includes an angled entry portion 40 which diverges toward axis 30 when moving from first end 14 toward second end 16. Flat entry surface portion 50 connects entry portion 40 to front inclined surface 24. Preferably, pipe 12 includes a bevel 64 which cooperates with angled entry portion 40 to facilitate initial compression radially inwardly of pipe 12 as the sleeve 10 is mounted on pipe 12. Preferably, outer surface 60 of pipe 12 and outer surface 20 of sleeve 10 are substantially the same in diameter such that existing fusing machines can be used to hydraulically press sleeve 10 on pipe 12. It is to be appreciated that other machines may be used to apply axial force to slidably position sleeve 10 on pipe 12 to the position shown in FIG. 3.

In the preferred embodiment, sleeve 10 includes a stop 42 which limits the amount of pipe 12 which can be received by sleeve 10. Stop 42 also helps reduce the likelihood of leakage of liquid as internal pressure increases by providing a radially inward extension which may help stop fluid from getting between the outer surface 60 of the pipe 12 and the inner surface 18 of sleeve 10. It is to be noted that the barbs 22,32 act as seals through their tight engagement with the pipe 12.

Figure 6:
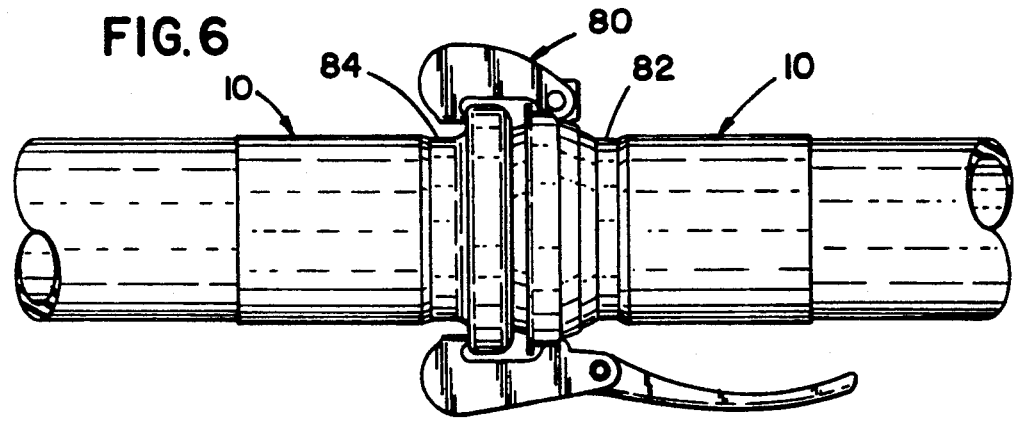
FIG. 6 is an example of coupling structure for connecting two pipes including a sleeve member mounted on each pipe and attachment structure connecting the two sleeve members.

Stop 42 also provides an increased thickness in the radial direction to permit sleeve 10 to be welded to a variety of different structures. As shown in FIG. 6, one structure which sleeve 10 can be attached to is coupling structure 80 which includes first member 82 and second member 84 which are latchable together as part of coupling 80. Coupling 80 is a Dallai, type B coupling which permits longitudinal axes of each sleeve to be positioned either co-linearly or at an angle. The Dallai, type B coupling also permits bending movement at the connection area once the first member 82 is latched to the second member 84.

Figure 4:
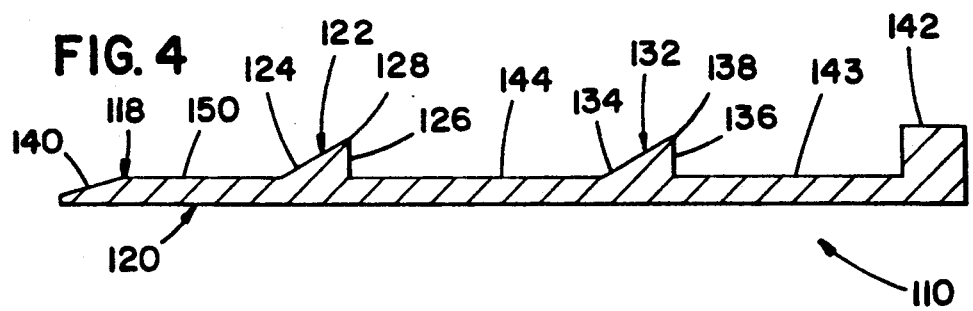
FIG. 4 is a cross-sectional profile of an alternative embodiment of a sleeve member according to principles of invention.
Figure 5:
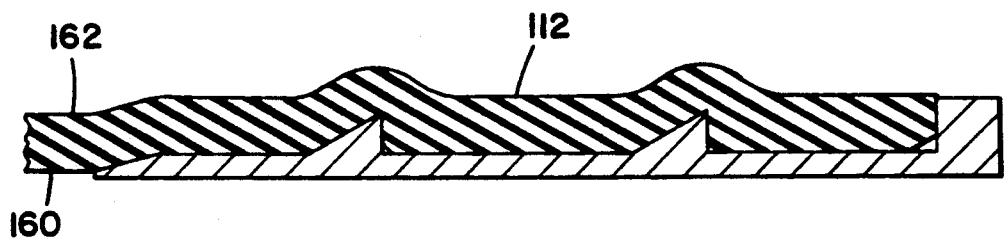
FIG. 5 is the cross-sectional profile view of the sleeve member shown in FIG. 4 with the pipe operatively inside the sleeve member.

Referring now to FIGS. 4 and 5, an alternative embodiment of sleeve 110 is shown. It is to be appreciated that the embodiment shown in FIGS. 1-3 is the preferred embodiment. However, other embodiments are possible employing the principles of the present invention such as the embodiment shown in FIGS. 4 and 5. Sleeve 110 has two substantially similar barbs 122,132. First barb 122 includes front inclined surface 124 and back surface 126 intersecting at barb tip 128. Second barb 132 includes front inclined surface 134 intersecting back surface 136 at barb tip 138. Sleeve 110 does not include the multi-level intermediate trough surface portion 41 between the two barbs. Instead, connecting back surface 126 to front surface 134 is substantially flat surface 144. A similar surface 143 is positioned between second barb 132 and stop 142. FIG. 5 illustrates pipe 112 positioned inside sleeve 110.

Figure 7:
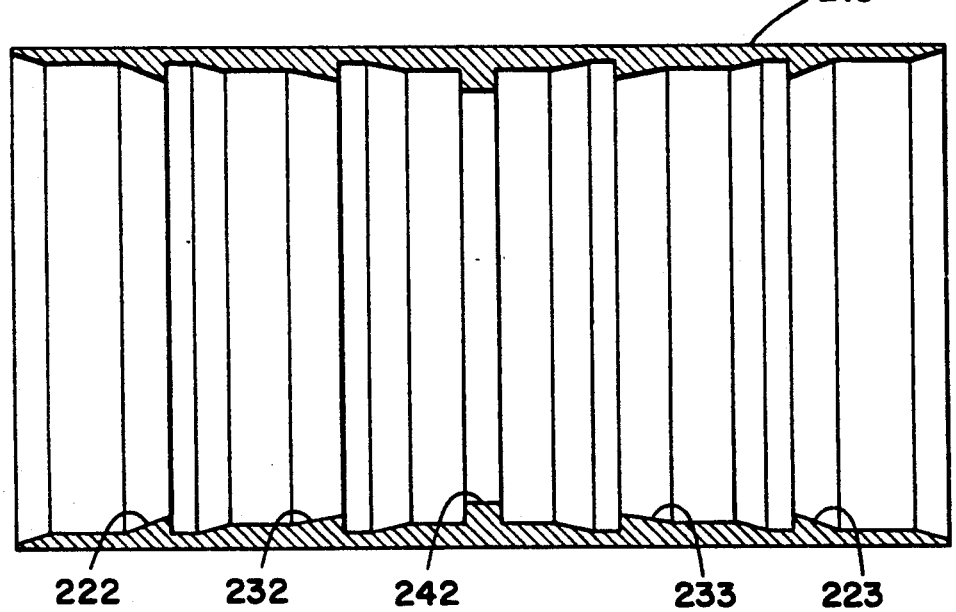
FIG. 7 is a cross-sectional view of another embodiment of the present invention illustrating a sleeve member adapted to receive a pipe from each end to connect the pipes with the sleeve member.

FIG. 7 illustrates a further alternative embodiment of a sleeve 210 structured to permit insertion of a pipe from both ends of sleeve 210. Sleeve 210 is basically two of sleeve 10 joined together. Sleeve 210 includes first barb 222 and second barb 232. These two barbs are designed to cooperate with an end of a first pipe (not shown) inserted into sleeve 210 through the opening on the left side of FIG. 7. Sleeve 210 further includes a first barb 223 on the right side of the sleeve 210 in FIG. 7. Second barb 233 is disposed between first barb 223 and stop 242. A second pipe (not shown) is insertable into the right side opening. FIG. 7 is an alternative-type structure for connecting the ends of two pipes to that structure shown in FIG. 6.

Sleeves 10,110,210 are preferably made from metal. Various manufacturing processes are anticipated for making sleeve 10 including machining and casting. Various metals are anticipated including steel, aluminum, and stainless steel.

With the present invention, several advantages arise since sleeve 10 is positioned on the outside surface 60 of pipe 12. One advantage is that with respect to polyethylene pipe, a variety of different pipe sizes are available for several different outside diameters. That is, industry standards for polyethylene pipe maintain several standard outside diameters. For each standard outside diameter, various pipe wall thicknesses exist, with each thickness providing different threshold pressure strengths. Because the outside diameter is consistent for each group of pipes, one sleeve 10 may be usable on a variety of pipes with different thicknesses. However, modifications may be necessary by those skilled in the art to achieve optimum performance as pipe dimensions and properties are varied.

Another advantage from using sleeve 10 in connection with polyethylene pipes is that no internal structure is needed to attach sleeve 10 to pipe 12. Because no internal structure is present, there is only minimal obstruction of liquid flow by compressing pipe 12 inwardly at the barb regions. Further, there is no additional pipe junction structure required to be expanded outwardly, or alternatively, inwardly, to compress the pipe as is often the case in some multiple piece fittings.

A further advantage of sleeve 10 is that it is versatile because a variety of different structures can be attached through welding or other processes to sleeve 10.

Another advantage of sleeve 10 is that it is easy to install in the field in that no heat or special add-on type structures are needed to attach to pipe 12. The only structure necessary to attach pipe 12 to sleeve 10 is an apparatus to apply an axial force sufficient to slide sleeve 10 onto pipe 12 until pipe 12 engages stop 42.

Another advantage in using sleeve 10 made from rigid material is that when pipe 12 is inserted into sleeve 10 and pressure applied internally, the sleeve 10 will remain substantially rigid and pipe 12 will be further pressed into the barbs 22,32, providing an even greater seal and attachment force.

A particular advantage with respect to the preferred embodiment shown in FIGS. 1-3 is that less material needs to be machined out of sleeve 10 in a machining process. Intermediate trough surface portion 41 has two levels, with raised surface 46 providing inner surface 18 with a smaller inner diameter than trough surface 44. The same occurs for the secondary trough surface portion 54. Therefore, less material need be machined out at raised surfaces 46,56 than compared to the structure shown in FIGS. 4 and 5. Barb height is the same in FIGS. 2 and 4 at back surfaces 26, 126, 36, 136 respectively. It is to be noted that barb height can vary in different applications and for different pipes.

The following is an example of the dimensions and configuration of sleeve 10 usable on a particular polyethylene pipe. The polyethylene pipe is a Duratuff® polyethylene pipe by Polaris Pipe Co. of Van Nuys, Calif. The pipe is a 4-inch pipe with an SDR of 17 (Standard Dimension Ratio=outside diameter of pipe divided by wall thickness). The pipe has an internal pressure rating of 100 psi. The pipe has an actual outside diameter of 4.5 inches (about 114.3 mm), an average inside diameter of 3.97 inches (about 100.8 mm), a minimum wall thickness of 0.265 inches (about 6.7 mm), and a weight of 1.53 pounds per foot.

In the example, sleeve 10 is provided with an outside diameter of approximately 4.5 inches (about 114.3 mm). Angled entry portion 40 tapers from an inner diameter of approximately 4.44 inches (about 111.8 mm) to an inner diameter of approximately 4.32 inches (about 109.7 mm) over a distance of approximately 0.25 inches (about 6.4 mm) along longitudinal axis 30. Entry surface portion 50 extends for a distance of approximately 0.55 inches (about 14.0 mm) substantially parallel to longitudinal axis 30. Front inclined surface 24 extends linearly from an inner diameter of approximately 4.32 inches (about 109.7 mm) to approximately 4.07 inches (about 103.4 mm) over a distance 26 is substantially transverse to longitudinal axis 30 and extends from an inner diameter of approximately 4.07 inches (about 103.4 mm) to an inner diameter of approximately 4.32 inches (about 109.7 mm). Trough surface portion 44 extends for a distance of approximately 0.187 inches (about 4.7 mm) substantially parallel to longitudinal axis 30. Ramp surface 48 extends linearly for a distance of approximately 0.238 inches (about 6.0 mm) from an inner diameter of approximately 4.32 inches (about 109.7 mm) to an inner diameter of approximately 4.2 inches (about 106.7 mm). Raised surface 46 extends for a distance of approximately 0.45 inches (about 11.4 mm) substantially parallel to longitudinal axis 30. Front inclined surface 34 of second barb 32 extends linearly a distance of approximately 0.375 inches (about 9.5 mm) from an inner diameter of approximately 4.2 inches (about 106.7 mm) to an inner diameter of approximately 4.07 inches (about 103.4 mm). Back surface 36 extends generally transverse to longitudinal axis 30 from an inner diameter of approximately 4.07 inches (about 103.4 mm) to approximately 4.32 inches (about 109.7 mm). Trough surface portion 54 extends for a distance of approximately 0.187 inches (about 4.7 mm) substantially parallel to longitudinal axis 30. Ramp surface 58 extends linearly for a distance of approximately 0.288 inches (about 7.3 mm) from an inner diameter of approximately 4.32 inches (about 109.7 mm) to approximately 4.2 inches (about 106.7 mm). Raised surface 56 extends substantially parallel to longitudinal axis 30 for a distance of approximately 0.4 inches (about 10.2 mm) until hitting stop 42.

The above dimensions are provided as an example of a preferred sleeve 10 for a particular pipe. Those skilled in the art will be able to vary the dimensions for different pipes used in connection with sleeve 10 to achieve optimum performance as the pipe 12 is varied.

When applying example sleeve 10 to pipe 12 with the dimensions given above and the polyethylene pipe noted above, about 4 tons of force was required in the axial direction. It is believed that the sleeve 10 may slide onto pipe 12 better if the axial movement is done more slowly rather than quickly. Tests under 0 psi internal pressure resulted in an average failure rate of about 8900-9000 pounds applied along the longitudinal axis 30 to the sleeve and to the pipe. Some tests indicated a failure level as high as 9400 pounds or greater.

As the outside diameter of pipe 12 is varied and also the thickness of pipe 12, sleeve 10 may need to be varied in construction to achieve optimal results. For example, the angles and lengths of the entry angled portion 40, the angles and lengths of the front inclined surfaces 24,34 of first and second barbs 22,32 may also be varied. Further, the height of each of the barbs 22,32 may be varied at back surfaces 26,36. Another variable that may impact performance of sleeve 10 is the spacing between the barbs along the longitudinal axis 30. The number of barbs may also be varied. Another variable is the flat portion dimensions of the entry surface portion 50, and the various parallel flat surfaces comprising the intermediate trough surface portion and the secondary trough surface portion.

One of the variables believed to impact performance significantly is the amount of compression applied by the barb tips to the pipe. Compression is the percent reduction in outer diameter of the pipe from its uncompressed state to the minimum diameter at the barb tips. In other words, the inner diameter defined by the barb tips may be varied to affect performance as pipe dimensions, properties, and composition change. With respect to the 4-inch pipe described above, it is believed that an inner diameter of sleeve 10 at the barb tips 28,38 should compress the pipe between 3 and 15 percent. If compression is too little, the sleeve 10 will not be adequately secured to pipe 12 during use. If compression is too much, sleeve 10 may not be able to be placed onto pipe 12 properly. It is believed that compression in the range of 6–12 percent is more preferred, and a compression of about 9 percent is most preferred with respect to the sleeve 10 provided with the dimensions above and pipe 12 having the size and properties above. Those skilled in the art will appreciate the ability to vary performance by varying the dimensions/angles of sleeve 10 as the size and dimensions of pipe 12 are varied.

An example is also provided of the alternate embodiment of sleeve 110 which works in connection with pipe 12 of the type described above, Polaris Pipe 4-inch SDR 17, 100 psi rating. The flat surface 144 and flat surface 146 extend substantially parallel to the longitudinal axis at a dimension of approximately 4.32 inches (about 109.7 mm) inner diameter between first barb 122 and second barb 132 and between second barb 132 and stop 142. The other dimensions are basically the same or substantially similar.

It must be understood, however, that even though numerous advantages and characteristics of the invention have been set forth in the foregoing description, together with details of the structure and function of the invention, the disclosure is illustrative only, and changes may be made in detail, especially in matters of shape, size, and material of components within the principles of the invention, to the full extent indicated by the broad general meanings of the terms in which the appended claims are expressed.

What is claimed is:

1. A pipe coupling device adapted to mount on an exterior surface of a pipe, said coupling device comprising:
    a generally cylindrical integral sleeve member having a first opening extending into said sleeve member and defining a longitudinal axis of said sleeve member, said first opening receiving said pipe in a direction of said longitudinal axis, said sleeve member further having an inner surface and an outer surface;
    a first concentric restrictive barb on said inner surface, said first barb comprising a first inclined surface and a second surface generally perpendicular to said longitudinal axis, said second surface intersecting said first inclined surface at a first barb tip; and
    a second concentric restrictive barb on said inner surface disposed at a spaced-apart distance from said first barb in a direction further away form said first opening than said first barb, said second barb comprising a first inclined surface, a second surface generally parallel to said longitudinal axis, a third inclined surface, said second surface extending from said first inclined surface of said second barb to said third inclined surface of said second barb, and a fourth surface generally perpendicular to said longitudinal axis, said fourth surface and said third inclined surface intersecting at a second barb tip.

2. The pipe coupling device of claim 1, further comprising a secondary trough surface portion disposed adjacent said fourth surface of said second barb, said secondary through surface portion comprising a first through surface generally parallel to said longitudinal axis, an inclined ramp surface, and a second trough surface generally parallel to said longitudinal axis.

3. The pipe coupling device of claim 1, further comprising a stop disposed on said inner surface extending radially inwardly and having a stop surface generally transverse to the longitudinal axis.

4. The pipe coupling device of claim 1, further comprising an angled surface entry portion having a surface diverging from the first opening toward said longitudinal axis and being disposed on said inner surface between said first opening and said first barb.

5. The pipe coupling device of claim 4, further comprising an entry surface portion generally parallel to the longitudinal axis between said angled surface entry portion and said first barb.

6. The pipe coupling device of claim 4, further comprising an entry surface portion generally parallel to the longitudinal axis between said angled surface entry portion and said first barb.

7. A pipe coupling comprising:
    a substantially rigid, metallic, cylindrical sleeve member of one piece construction having a first end, a second end, and a longitudinal axis extending from said first end toward said second end, said sleeve member having an inner surface concentrically disposed about said longitudinal axis of said sleeve member and extending from said first end toward said second end;
    a restrictive first barb on said inner surface projecting inwardly and extending circumferentially around said inner surface, said first barb providing said sleeve member with an inner diameter less than an inner diameter adjacent said first barb in either direction from said first barb along said longitudinal axis;
    a second barb disposed between said first barb and said second end;
    an intermediate trough surface portion between said first barb and said second barb, said intermediate trough surface portion comprising a first trough surface generally parallel to said longitudinal axis adjacent said first barb, said intermediate trough surface portion further comprising a second trough surface generally parallel to said longitudinal axis and adjacent said second barb, said first trough surface providing said sleeve member with an inner diameter greater than an inner diameter at said second trough surface, said inner diameters at said first trough surface and said second trough surface being greater than the inner diameters defined by said first barb and said second barb, said intermediate trough surface portion further comprising an inclined ramp surface linking said first trough surface to said second trough surface; and
    a pipe having an exterior surface and a fluid passage through said pipe, said pipe having resilient properties when compressed radially inwardly, said pipe having an exterior diameter in an uncompressed state greater than said inner diameter of said sleeve member at said first barb;
    said first barb engaging said exterior surface of said pipe and compressing said pipe when said sleeve member receives said pipe in a direction from said first end toward said second end along said longitudinal axis, wherein said first barb compresses said pipe in the region at said first barb to a diameter equal to said diameter of said sleeve member defined by said first barb, and wherein the resilient properties of said pipe expand said exterior surface of said pipe in the regions adjacent the region at said first barb to define diameters greater than the diameter of the pipe at the region at said first barb to restrict sliding movement of said sleeve member away from said pipe thereby securely mounting said sleeve to said pipe.

8. The pipe coupling device of claim 7, further comprising a stop disposed on said inner bore surface extending radially inwardly and having a stop surface generally transverse to said longitudinal axis.

9. The pipe coupling device of claim 7, further comprising an angled surface entry portion having a surface diverging form the first end toward said longitudinal axis and being disposed on said inner surface between said first end and said first barb.

10. The pipe coupling device of claim 9, further comprising an entry surface portion generally parallel to longitudinal axis between said angled surface entry portion and said first barb.

11. A pipe coupling device adapted to mount on an exterior surface of a pipe, said coupling device comprising:
   a generally cylindrical integral sleeve member having a first opening extending into said sleeve member and defining a longitudinal axis of said sleeve member, said first opening receiving said pipe in a direction of said longitudinal axis, said sleeve member further having an inner surface and an outer surface;
   a first concentric restrictive barb on said inner surface, said first barb comprising a first inclined surface and a second surface generally perpendicular to said longitudinal axis, said second surface intersecting said first inclined surface at a first barb tip;
   a second concentric restrictive barb on said inner surface disposed at a spaced-apart distance from said first barb in a direction further away form said first opening than said first barb, said second barb comprising a first inclined surface, a second surface generally parallel to said longitudinal axis, a third inclined surface, and a fourth surface generally perpendicular to said longitudinal axis, said fourth surface and said third inclined surface intersecting at a second barb tip; and
   a secondary trough surface portion disposed adjacent said fourth surface of said second barb, said secondary trough surface portion comprising a first trough surface generally parallel to said longitudinal axis, an inclined ramp surface, and a second trough surface generally parallel to said longitudinal axis.

12. A pipe coupling device adapted to mount on an exterior surface of a pipe, said coupling device comprising:
   a generally cylindrical integral sleeve member having a first opening extending into said sleeve member and defining a longitudinal axis of said sleeve member, said first opening receiving said pipe in a direction of said longitudinal axis, said sleeve member further having an inner surface and an outer surface;
   a first concentric restrictive barb on said inner surface, said first barb comprising a first inclined surface and a second surface generally perpendicular to said longitudinal axis, said second surface intersecting said first inclined surface at a first barb tip;
   a second concentric restrictive barb on said inner surface disposed at a spaced-apart distance from said first barb in a direction further away form said first opening than said first barb, said second barb comprising a first inclined surface, a second surface generally parallel to said longitudinal axis, a third inclined surface, and a fourth surface generally perpendicular to said longitudinal axis, said fourth surface and said third inclined surface intersecting at a second barb tip; and
   a stop disposed on said inner surface extending radially inwardly and having a stop surface generally transverse to the longitudinal axis.

13. A pipe coupling device adapted to mount on an exterior surface of a pipe, said coupling device comprising:
   a generally cylindrical integral sleeve member having a first opening extending into said sleeve member and defining a longitudinal axis of said sleeve member, said first opening receiving said pipe in a direction of said longitudinal axis, said sleeve member further having an inner surface and an outer surface;
   a first concentric restrictive barb on said inner surface, said first barb comprising a first inclined surface and a second surface generally perpendicular to said longitudinal axis, said second surface intersecting said first inclined surface at a first barb tip;
   a second concentric restrictive barb on said inner surface disposed at a spaced-apart distance from said first barb in a direction further away form said first opening than said first barb, said second barb comprising a first inclined surface, a second surface generally parallel to said longitudinal axis, a third inclined surface, and a fourth surface generally perpendicular to said longitudinal axis, said fourth surface and said third inclined surface intersecting at a second barb tip; and
   an angled surface entry portion having a surface diverging from the first opening toward said longitudinal axis and being disposed on said inner surface between said first opening and said first barb.

* * * * *

UNITED STATES PATENT AND TRADEMARK OFFICE
CERTIFICATE OF CORRECTION

PATENT NO. : 5,211,429

DATED : May 18, 1993

INVENTOR(S) : Norman E. Charlson et al.

It is certified that error appears in the above-identified patent and that said Letters Patent is hereby corrected as shown below:

Column 3, line 60 insert --inside the-- after the word "positioned".

Column 3, line 63 insert --the present-- after the word "of".

Column 3, line 66 insert --positioned-- after the word "operatively".

Column 7, line 62 insert --of approximately 0.325 inches (about 8.3 mm). Back surface-- after the word "distance".

Column 9, line 48 "form" should read --from--.

Column 9, lines 61 and 62 "through" should read --trough--.

Column 11, line 33 "form" should read --from--.

Column 12, line 12 "form" should read --from--.

UNITED STATES PATENT AND TRADEMARK OFFICE
CERTIFICATE OF CORRECTION

PATENT NO. : 5,211,429
DATED : May 18, 1993
INVENTOR(S) : Norman E. Charlson et al.

It is certified that error appears in the above-indentified patent and that said Letters Patent is hereby corrected as shown below:

Column 12, line 41 "form" should read --from--.

Signed and Sealed this

Fifteenth Day of February, 1994

Attest:

BRUCE LEHMAN

Attesting Officer

Commissioner of Patents and Trademarks